United States Patent [19]

Koshino

[11] Patent Number: 5,531,132
[45] Date of Patent: Jul. 2, 1996

[54] CAM APPARATUS USING AN ELECTROMAGNET AND GEARS FOR DECELERATING A MOTOR

[75] Inventor: Katsuhiko Koshino, Neyagawa, Japan

[73] Assignee: Matsushita Electric Industrial Co., Ltd., Kadoma, Japan

[21] Appl. No.: 180,226

[22] Filed: Jan. 12, 1994

[30]  Foreign Application Priority Data

Jan. 14, 1993  [JP]  Japan .................................. 5-004644

[51] Int. Cl.⁶ .................................................. F16H 55/17
[52] U.S. Cl. .................................................. 74/435
[58] Field of Search ........................... 74/435; 192/33 R, 192/142 R; 360/93.6, 109

[56]  References Cited

U.S. PATENT DOCUMENTS

| | | | |
|---|---|---|---|
| 5,260,844 | 11/1993 | Koga et al. | 360/96.3 |
| 5,307,221 | 4/1994 | Mikawa et al. | 360/96.3 |

Primary Examiner—Charles A. Marmor
Assistant Examiner—MaryAnn Battista
Attorney, Agent, or Firm—Renner, Otto, Boisselle & Sklar

[57]  ABSTRACT

A cam apparatus including a cam gear having a toothless area and teeth at a circumferential surface thereof and also having a first projection and a second projection on a surface thereof; a driving gear for engaging the teeth of the cam gear to rotate the cam gear by a driving force transmitted from a motor through a deceleration mechanism; a lever for engaging another surface of the cam gear thus to pivot in accordance with rotation of the cam gear; a lock lever having an end for sequentially engaging the first and the second projections of the cam gear while the driving gear is opposed to the toothless area of the cam gear; a spring for biasing the lock lever to engage the first projection; and an electromagnet for engaging another end of the lock lever. The lock lever is positioned to be released from the first projection and to engage the second projection before the driving gear engages the teeth of the cam gear when the electromagnet is turned ON.

6 Claims, 6 Drawing Sheets

CAM APPARATUS USING AN ELECTROMAGNET AND GEARS FOR DECELERATING A MOTOR

BACKGROUND OF THE INVENTION

1. Field of the Invention

The present invention relates to a cam apparatus using an electromagnet and gears for decelerating a motor.

2. Description of the Related Art

Recently, many apparatuses including tape recorders and disc mounting apparatuses have been developed which are electromagnetically driven. Cam apparatuses using an electromagnet and gears for decelerating a motor are generally used as such an electromagnetic driving mechanism.

Briefly referring to FIGS. 10 through 16, a conventional cam apparatus 50 will be described.

FIGS. 10 through 12 are plan views of the cam apparatus 50 each illustrating a step of operation; and FIGS. 13 through 15 are plan views of the cam apparatus 50, in which a cam gear 31 is shown as being transparent in order to clearly show positional relationship between the cam gear 31 and a lever 37 in each of the steps of operation shown in FIGS. 10 through 12. FIG. 16 is a cross sectional view of the cam apparatus 50 viewed along the section line 16—16 in FIG. 10.

The cam apparatus 50 includes the cam gear 31 including a toothless area 40 having no teeth, a driving gear 32 for driving the cam apparatus 50, a lock lever 33, and a lever 37. The lock lever 33 is biased counterclockwise around a shaft 39 by a spring 34. An end 43 of the lock lever 33 is in engagement with a projection 41 of the cam gear 31 so that the toothless area 40 can be opposed to the driving gear 32. The other end 44 is in engagement with a movable piece 36 of an electromagnet 35. Although not shown, the driving gear 32 is driven by a motor through a deceleration mechanism. The driving gear 32 is intended to rotate counterclockwise as is shown by arrow m in FIG. 10 when the motor is turned "ON".

As is shown in FIGS. 13 through 15, the lever 37 is rotatable around a shaft 45 which is concentric with the driving gear 32. As is also shown in FIG. 16, the lever 37 has a projection 46 at an end thereof, and the projection 46 is in engagement with a cam groove 47 provided at a rear surface of the cam gear 31. When the cam gear 31 pivots clockwise, the lever 37 is also intended to pivot through the engagement of the projection 46 along the cam groove 47. By such pivoting, the head of the tape recorder is moved up and down or the driving of the disc mounting apparatus is switched over.

Although the lever 37 rotates around the shaft 45 which is concentric with the driving gear 32 in FIGS. 13 through 15, the lever 37 may rotate around any other point.

The cam apparatus 50 having such a structure operates in the following manner:

In FIG. 10, the cam gear 31 stops with the end 43 of the lock lever 33 engaging the projection 41 of the cam gear 31 by the biasing force of the spring 34. The toothless area 40 of the cam gear 31 and the driving gear 32 are opposed to each other. When the electromagnet 35 is turned ON to pull the movable piece 36 leftward in FIG. 10, the lock lever 33 pivots clockwise around the shaft 39 against the force of the spring 34. Therefore, as is shown in FIG. 11, the end 43 of the lock lever 33 is released from the projection 41 of the cam gear 31. Then, the cam gear 31 rotates clockwise as is shown by arrow n in FIGS. 11 and 12 by the biasing force of the lever 37 which will be described later in detail. As a result, teeth 42 of the cam gear 31 and the driving gear 32 engage each other as is shown in FIG. 12. The cam gear 31 keeps rotating until the next toothless area is opposed to the driving gear 32, namely, until the end 43 of the lock lever 33 engages the next projection 41.

While the cam apparatus 50 is in the state illustrated in FIG. 10, the projection 46 is engaged with the cam groove 47 of the cam gear 31 as is shown in FIG. 13. The lever 37 is biased clockwise by a spring 38. By this biasing force of the lever 37, the cam gear 31 rotates clockwise. When the electromagnet 35 is turned ON, the teeth 42 of the cam gear 31 engage the driving gear 32 as is mentioned above and also illustrated in FIG. 12. During the engagement of the driving gear 32 and the teeth 42, the lever 37 pivots through the engagement of the projection 46 along the cam groove 47 in the cam gear 31 as is shown in FIG. 14. When the next toothless area is opposed to the driving gear 32, the lever 37 stops in the state of being biased counterclockwise by the spring 38 as is shown in FIG. 15. In this manner, each time the electromagnet 35 is turned ON, the lever 37 pivots between the two positions illustrated in FIGS. 13 and 15.

FIG. 17 is a general cam diagram, which illustrates the relationship between the rotation angle of the cam gear and a distance by which the projection of the lever travels. At point a, the cam gear 31 is locked as is illustrated in FIGS. 10 and 13. At point b, the driving gear 32 and the teeth 42 of the cam gear 31 start engaging each other as is shown in FIG. 11. At point c, the cam gear 31 is locked again as is illustrated in FIG. 15. Point d is a middle point of the movement of the lever 37. As the lever 37 moves farther from point d in either direction, the lever 37 is biased toward point d with a stronger force. At point e, the lever 37 is away from the starting point thereof at point a by a maximum distance. After point e, the cam gear 31 rotates by sliding of the projection 46 along a slanting portion of the cam groove 47 even without the force of the driving gear 32 until the projection 46 reaches point d. From point b to point f, the teeth 42 and the driving gear 32 are in engagement with each other, and the cam gear 31 rotates by the driving force of the driving gear 32. From point f to point g, the driving gear 32 is opposed to the toothless area 40, and the cam gear 31 rotates by the sliding of the projection 46 along the cam groove 47. From point g to point i, the driving gear 32 is again in engagement with the teeth 42, and the cam gear 31 rotates by the driving force of the driving gear 32 through point h at which the lever 37 is away from point e by a maximum distance. At point i, the driving gear 32 is disengaged from the teeth 42, and at point a, the cam gear 31 is locked again as is shown in FIGS. 10 and 13. Since the cam gear 31 rotates by the sliding of the projection 46 along the cam groove 47 until the driving gear 32 comes out of engagement with the teeth 42, the cam gear 31 would rotate 360° without the engagement of the end 43 of the lock lever 33 and the projection 41 of the cam gear 31.

The above-described conventional cam apparatus 50 has the problem of generating noise. The noise is generated, for example, when the driving gear 32 engages the teeth 42 (FIG. 11) or when the projection 46 of the lever 37 slides along the cam groove 47 in acceleration.

SUMMARY OF THE INVENTION

A cam apparatus according to the present invention includes a cam gear having a toothless area and teeth at a circumferential surface thereof and also having a first projection and a second projection on a surface thereof; a driving gear for engaging the teeth of the cam gear to rotate the cam gear by a driving force transmitted from a motor through a deceleration mechanism; a lever for engaging another surface of the cam gear thus to pivot in accordance with rotation of the cam gear; a lock lever having an end for sequentially engaging the first and the second projections of the cam gear while the driving gear is opposed to the toothless area of the cam gear; a spring for biasing the lock lever to engage the first projection; and an electromagnet for engaging another end of the lock lever. The lock lever is positioned to be released from the first projection and to engage the second projection before the driving gear engages the teeth of the cam gear when the electromagnet is turned ON.

In one embodiment of the invention, the first and the second projections are opposed to each other.

In one embodiment of the invention, the lock lever is positioned to engage the second projection while the electromagnet is in an ON state, and to be released from the second projection when the electromagnet is turned OFF after a preset time period.

In one embodiment of the invention, the first and the second projections are adjacent to each other.

In one embodiment of the invention, the lock lever is positioned to be released from the first projection when the electromagnet is turned ON, to engage the second projection when the electromagnet is turned OFF after a preset time period, and to be released from the second projection when the electromagnet is turned OFF after another preset time period.

In one embodiment of the invention, the lever has a projection at an end thereof, and the cam surface of the cam gear has a cam groove for engaging the projection.

Thus, the invention described herein makes possible the advantage of providing a cam apparatus generating little noise.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

A first example of a cam apparatus according to the present invention will be described.

Figure 3:
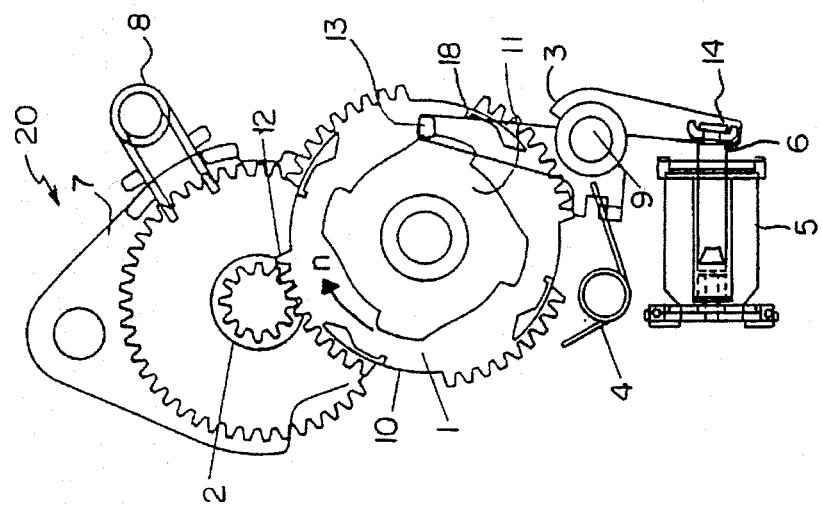
FIGS. 1 through 3 are plan views of a cam apparatus in a first example according to the present invention, each respective figure showing a different position of the cam gear.
Figure 2:
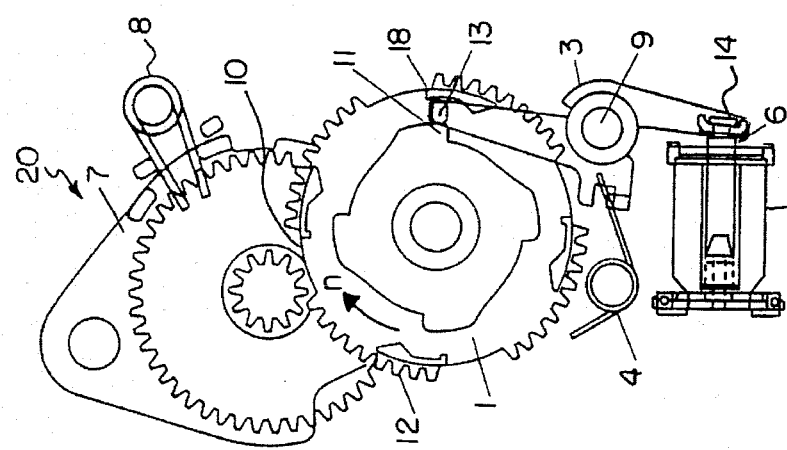
Figure 1:
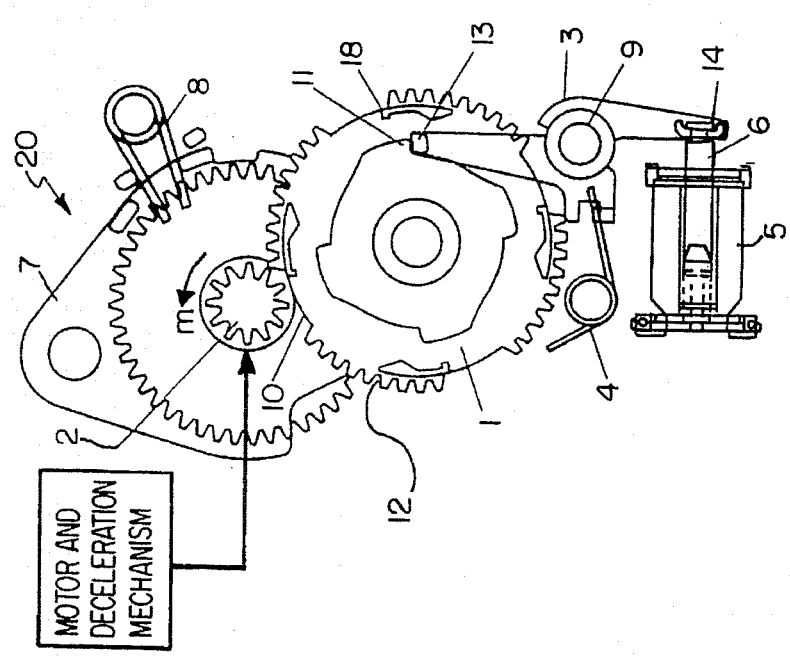
Figure 6:
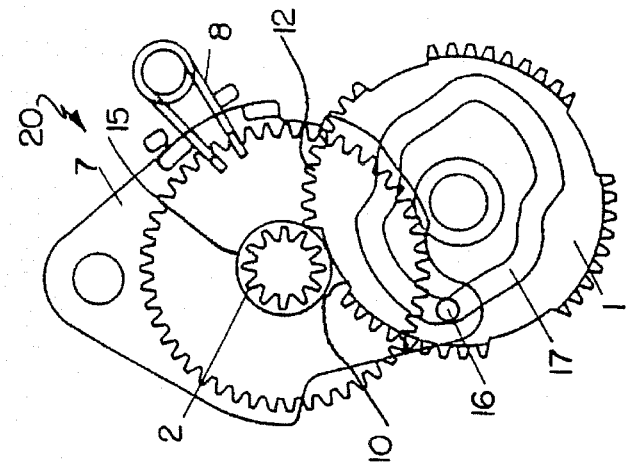
Figure 5:
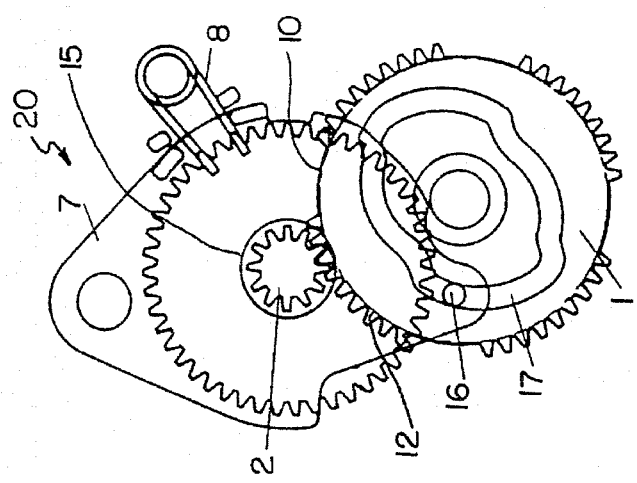
Figure 4:
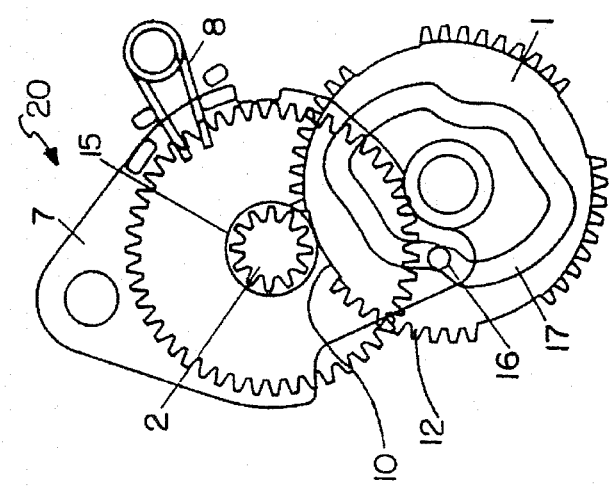
FIGS. 4 though 6 are plan views of the cam apparatus in the first example showing the positional relationship between the cam gear and the lever in the positions correspond to FIGS. 1 through 3.

FIGS. 1 through 3 are plan views of a cam apparatus 20 in a first example according to the present invention each illustrating a step of operation; and FIGS. 4 through 6 are plan views of the cam apparatus in the first example according to the present invention, in which a cam gear 1 is shown as being transparent in order to clearly show positional relationship between the cam gear i and a lever 7 in each of the steps of operation shown in FIGS. 1 through 3.

The cam apparatus 20 includes the cam gear 1 including a toothless area 10 having no teeth, a driving gear 2 for driving the cam apparatus 20, a lock lever 3, and a lever 7. The lock lever 3 is biased counterclockwise around a shaft 9 by a spring 4. An end 13 of the lock lever 3 is in engagement with a projection 11 of the cam gear 1 so that the toothless area 10 can be opposed to the driving gear 2. The other end 14 is in engagement with a movable piece 6 of an electromagnet 5. As shown in FIG. 1, the driving gear 2 is driven by a motor through a deceleration mechanism. The driving gear 2 is intended to rotate counterclockwise as is shown by arrow m in FIG. 1 when the motor is turned ON. The cam gear 1 has another projection 18 which is substantially opposed to the projection 11 to engage the lock lever 3 when the lock lever 3 pivots.

As is shown in FIGS. 4 through 6, the lever 7 is rotatable around a shaft 15 which is concentric with the driving gear 2. The lever 7 has a projection 16 at an end thereof, and the projection 16 is in engagement with a cam groove 17 provided at a rear surface of the cam gear 1. When the cam gear 1 pivots clockwise, the lever 7 is also intended to pivot through the engagement of the projection 16 along the cam groove 17.

The cam apparatus 20 having such a structure operates in the following manner:

In FIG. 1, the cam gear 1 stops with the end 13 of the lock lever 3 engaging the projection 11 of the cam gear 1 by the biasing force of the spring 4. The toothless area 10 of the cam gear 1 and the driving gear 2 are opposed to each other. When the electromagnet 5 is turned ON to pull the movable piece 6 leftward in FIG. 1, the lock lever 3 pivots clockwise around the shaft 9 against the force of the spring 4. Therefore, as is shown in FIG. 2, the end 13 of the lock lever 3 is released from the projection 11 and then engages the projection 18 of the cam gear 1. Then, the cam gear 1 rotates clockwise as is shown by arrow n in FIG. 2 by the biasing force of the lever 7 which will be described later in detail. The end 13 of the lock lever 3 and the projection 18 are kept in engagement through the ON-period of the electromagnet 5, thereby preventing engagement of the driving gear 2 and the teeth 12 of the cam gear 1. When the electromagnet 5 is turned OFF after a preset time period, the moving piece 6 moves back rightward by the spring 4, and the lock lever 3 pivots counterclockwise. Therefore, the end 13 of the lock lever 3 is released from the projection 18, thereby allowing the cam gear 1 to rotate clockwise. Thus, the driving gear 2 and the teeth 12 of the cam gear 1 are put into engagement with each other as is shown in FIG. 3. The engagement is continued until the driving gear 2 is opposed to the next toothless area of the cam gear 1, namely, until the end 13 of the lock lever 3 engages the next projection 11.

While the cam apparatus 20 is in the state illustrated in FIG. 1, the projection 16 is engaged with the cam groove 17 of the cam gear 1 as is shown in FIG. 4. The lever 7 is biased clockwise by a spring 8. By this biasing force of the lever 7, the cam gear 1 rotates clockwise. When the electromagnet 5 is turned ON, the teeth 12 of the cam gear 1 engage the driving gear 2 as is mentioned above and also illustrated in FIG. 3. During the engagement of the driving gear 2 and the teeth 12, the lever 7 pivots through the engagement of %he projection 16 along the cam groove 17 in the cam gear 1 as is shown in FIG. 5. When the next toothless area is opposed to the driving gear 2, the lever 7 stops in the state of being biased counterclockwise by the spring 8 as is illustrated in FIG. 6. In this manner, each time the electromagnet 5 is turned ON, the lever 7 pivots between the two positions shown in FIGS. 4 and 6.

Figure 17:
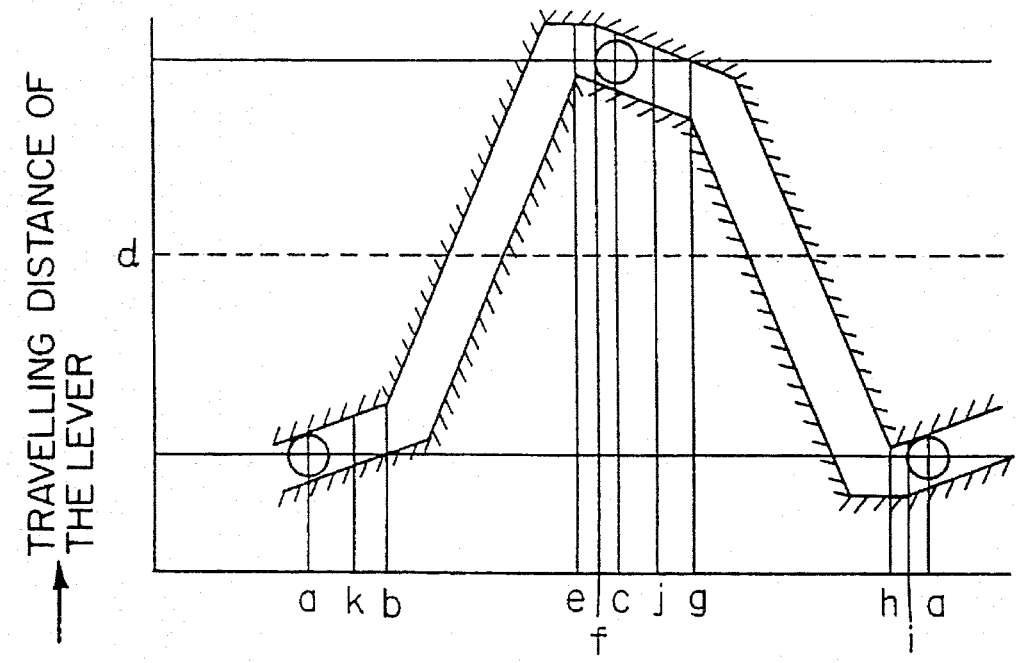
FIG. 17 is a cam diagram of a conventional cam apparatus and a cam apparatus according to the present invention.

Referring to FIG. 17, the end 13 of the lock lever 3 engages the projection 18 at point k before the driving gear 2 and the teeth 12 engage each other at point b. The end 13 of the lock lever 3 again engages the projection 18 at point j before the engagement of the driving gear 2 and the teeth 12.

In the cam apparatus 20 according to the present invention, after the cam gear 1 is released from the lock lever 3 by turning the electromagnet 5 ON, the cam gear 1 again engages the lock lever 3 through the end 13 and the projection 18 before reaching the position to allow the teeth 12 to engage the driving gear 2. With such a structure, the driving gear 2 engages the teeth 12 slowly and smoothly. The projection 16 also slides along the cam groove 17 gradually and smoothly. Thus, the noise is significantly reduced.

EXAMPLE 2

A second example of a cam apparatus according to the present invention will be described.

Figure 9:
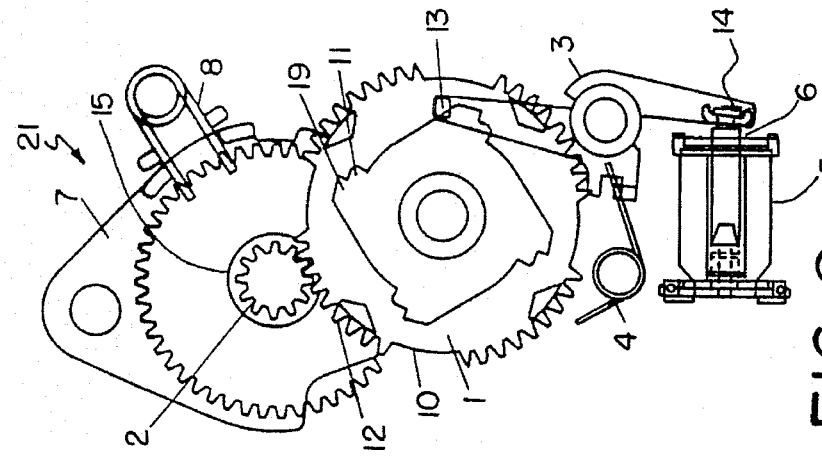
FIGS. 7 through 9 are plan views of a cam apparatus in a second example according to the present invention, each respective figure showing a different position of the cam gear.
Figure 8:
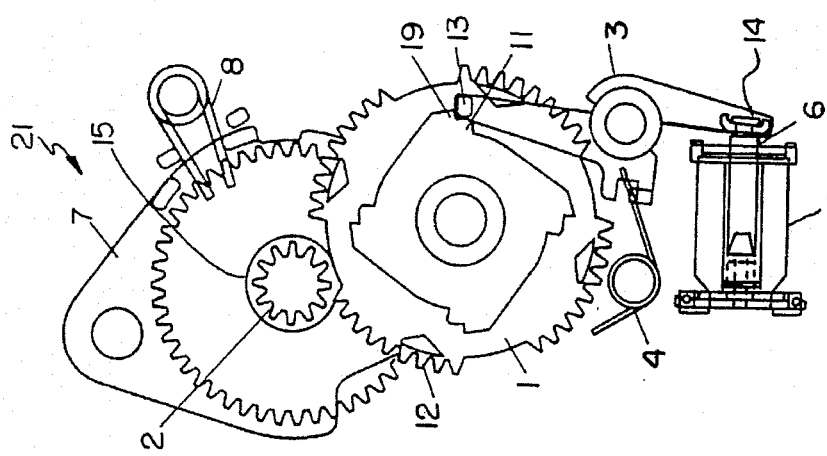
Figure 7:
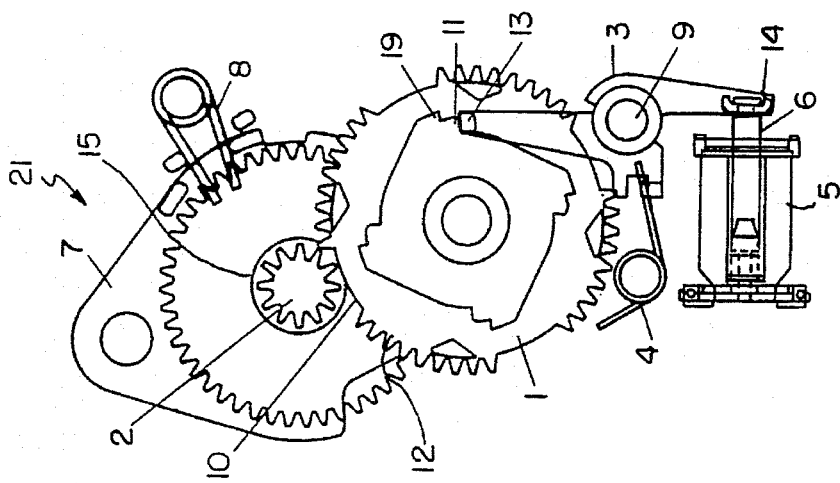
Figure 12:
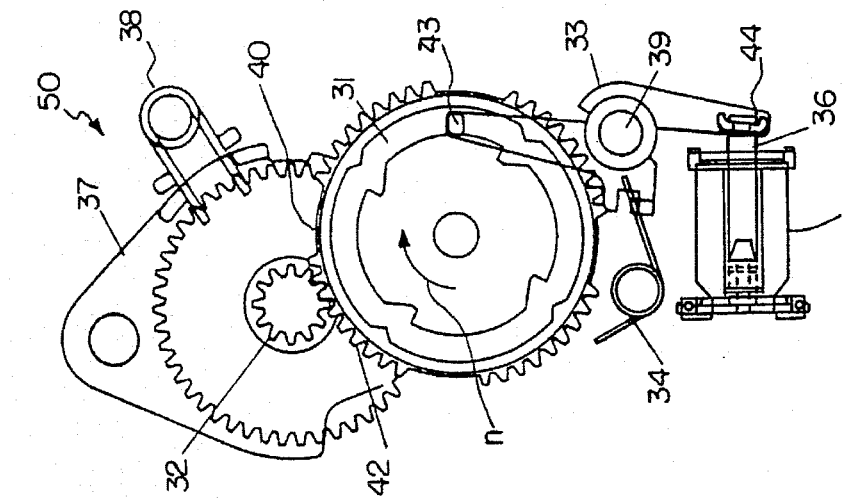
FIGS. 10 through 12 are plan views of a conventional cam apparatus, each respective figure showing a different position of the cam gear.
Figure 11:
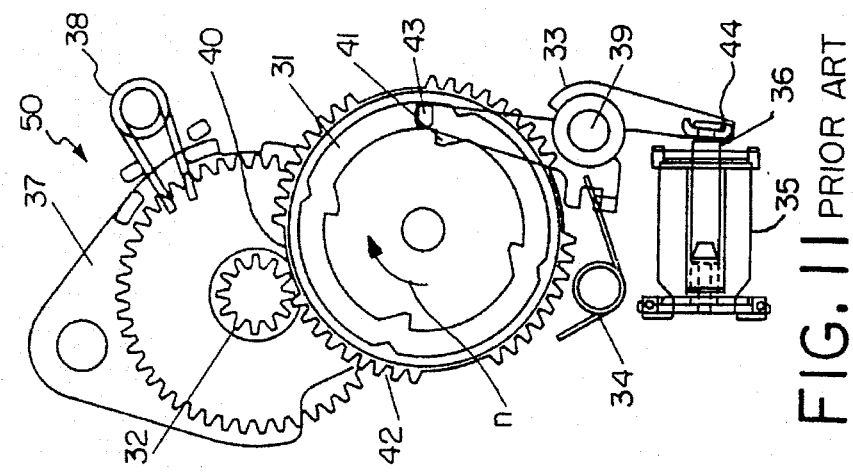
Figure 10:
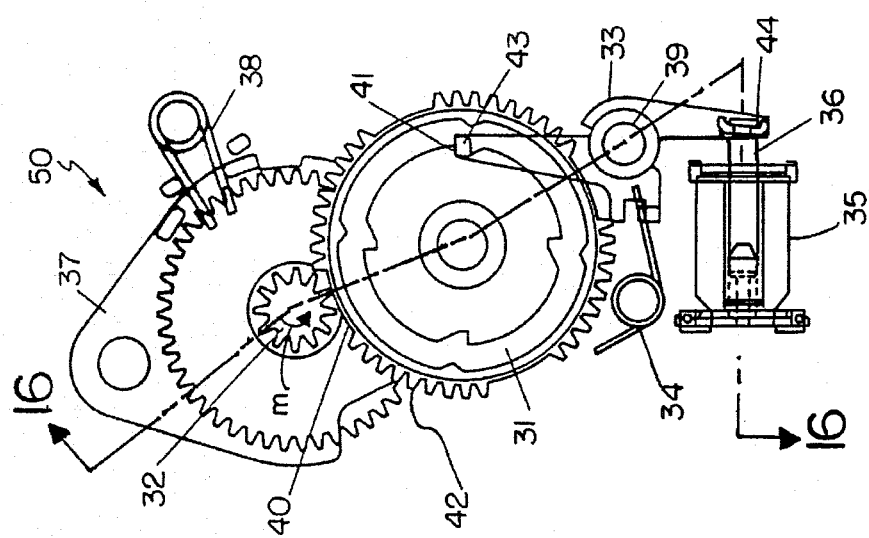
Figure 15:
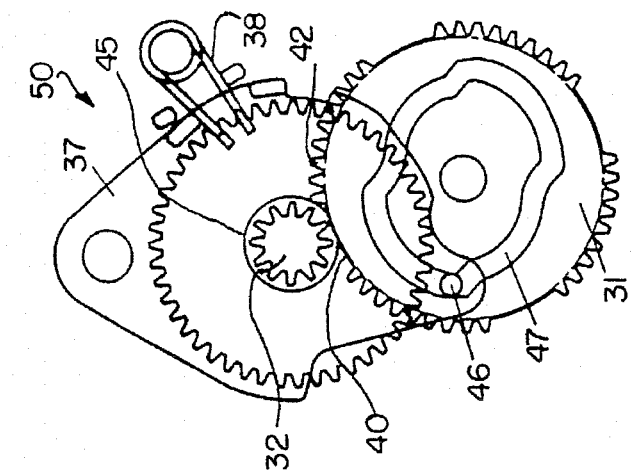
FIGS. 13 through 15 are plan views of the conventional cam apparatus showing the positional relationship between the cam gear and the lever in the positions corresponding to FIGS. 10–12.
Figure 14:
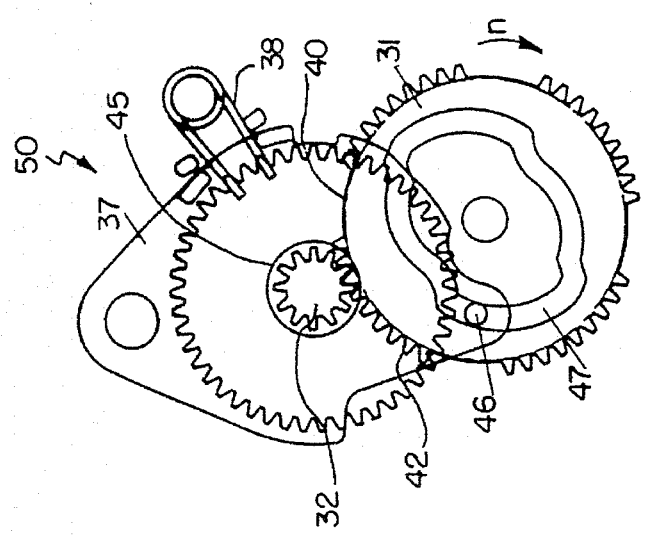
Figure 13:
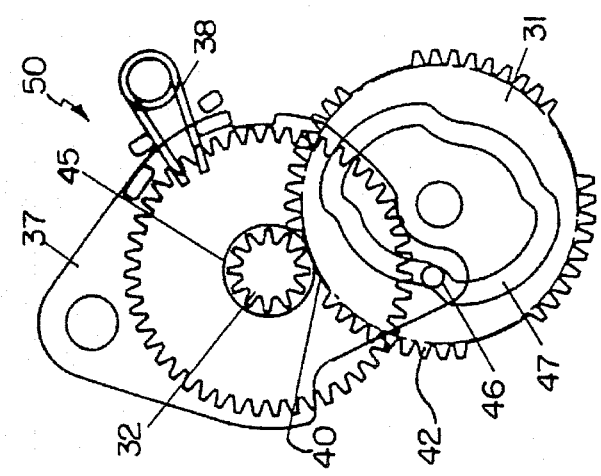
Figure 16:
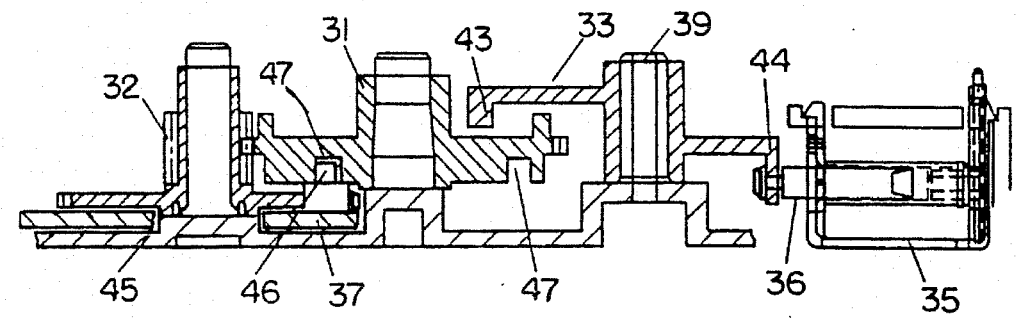
FIG. 16 is a cross sectional view of the cam apparatus shown in FIGS. 10 through 15 showing section line 16—16 in FIG. 10.

FIGS. 7 through 9 are plan views of a cam apparatus 21 in a second example according to the present invention each illustrating a step of operation. Identical elements with those in the first example bear identical reference numerals therewith.

The cam apparatus 21 has the same structure with that of the cam apparatus 20 except that the cam gear 1 has a projection 19 adjacent to the projection 11, instead of the projection 18.

The cam apparatus 21 operates in the following manner:

In FIG. 7, the cam gear 1 stops with the end 13 of the lock lever 3 engaging the projection 11 of the cam gear 1 by the biasing force of the spring 4. The toothless area 10 of the cam gear 1 and the driving gear 2 are opposed to each other. When the electromagnet 5 is turned ON to pull the movable piece 6 leftward in FIG. 7, the lock lever 3 pivots clockwise around the shaft 9 against the biasing force of the spring 4, thereby releasing the end 13 of the lock lever 7 from the projection 11. When the electromagnet 5 is turned OFF after a preset time period, as is shown in FIG. 8, the end 13 engages the projection 19 of the cam gear 1 by the biasing force of the spring 4, thereby preventing engagement of the driving gear 2 and the teeth 12 of the cam gear 1. When the electromagnet 5 is again turned ON after another preset time period, as is shown in FIG. 9, the end 13 is released from the projection 19. Thus, the driving gear 2 engages the teeth 12 of the cam gear 1. The engagement is continued until the driving gear 2 is opposed to the next toothless area of the cam gear 1, namely, until the end 13 of the lock lever 3 engages the next projection 11.

The engagement of the projection (not shown) of the lever 7 and the cam groove (not shown) in the cam gear 1 functions in the same manner as in the first example.

In the cam apparatus 21 according to the present invention, after the cam gear 1 is released from the lock lever 3 by turning the electromagnet 5 ON, the cam gear 1 again engages the lock lever 3 through the end 13 of the lock lever 3 and the projection 19 of the cam gear 1 in the OFF-state before reaching the position to allow the teeth 12 of the cam gear 1 to engage the driving gear 2. With such a structure, the driving gear 2 engages the teeth 12 slowly and smoothly. The projection also slides along the cam groove gradually and smoothly in the same manner as mentioned in the first example. Thus, the noise is significantly reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A cam apparatus, comprising:

a cam gear having a toothless area and teeth at a circumferential surface thereof and also having a first locking projection and a second locking projection on a surface thereof;

a driving gear for engaging the teeth of the cam gear to rotate the cam gear by a driving force transmitted from a motor through a deceleration mechanism;

a lever for engaging another surface of the cam gear thus to pivot in accordance with rotation of the cam gear;

a lock lever having an end for sequentially engaging the first and the second locking projections of the cam gear while the driving gear is opposed to the toothless area of the cam gear;

a spring for biasing the lock lever to engage the first locking projection; and an electromagnet for engaging another end of the lock lever, wherein the lock lever is positioned to be released from the first locking projection when the electromagnet is turned ON and to engage the second locking projection before the driving gear engages the teeth of the cam gear, whereby the second locking projection locks the end released from the first locking projection and prevents the cam pear from rotating before the driving gear engages the teeth of the cam gear.

2. A cam apparatus according to claim 1, wherein the first and the second locking projections are opposed to each other.

3. A cam apparatus according to claim 2, wherein the lock lever is positioned to engage the second locking projection while the electromagnet is in an ON state, and to be released from the second locking projection when the electromagnet is turned OFF after a preset time period.

4. A cam apparatus according to claim 1, wherein the first and the second locking projections are adjacent to each other.

5. A cam apparatus according to claim 4, wherein the lock lever is positioned to be released from the first locking projection when the electromagnet is turned ON, to engage the second locking projection when the electromagnet is turned OFF after a preset time period, and to be released from the second locking projection when the electromagnet is turned ON after another preset time period.

6. A cam apparatus according to claim 1, wherein the lever has a projection at an end thereof, and the another surface of the cam gear has a cam groove for engaging the projection of the lever.

* * * * *